No. 730,375. PATENTED JUNE 9, 1903.
A. J. KAPPELE.
MECHANICAL MOVEMENT.
APPLICATION FILED SEPT. 4, 1902.
NO MODEL.
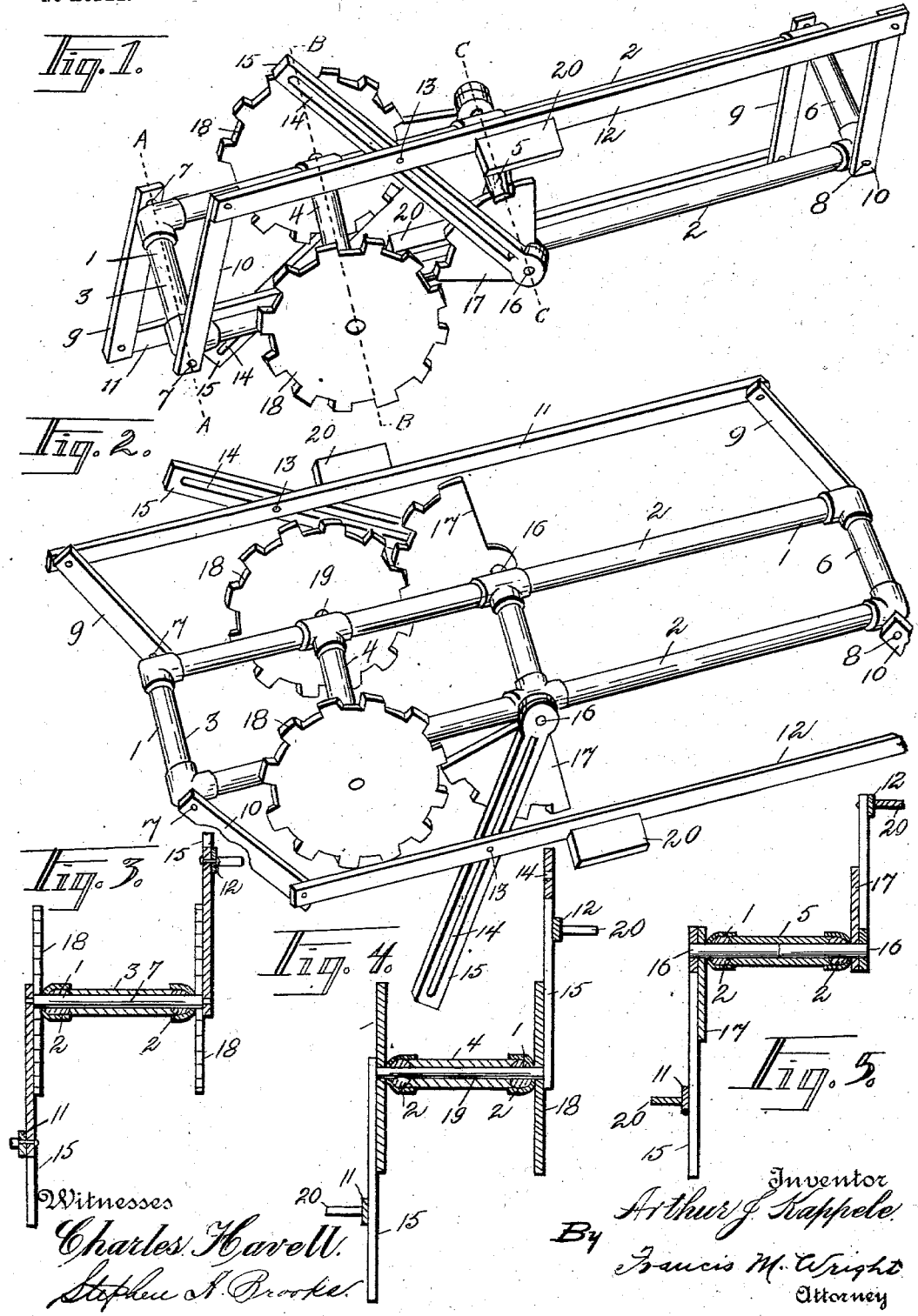
Witnesses
Charles Havell.
Stephen A. Brooke.
Inventor
Arthur J. Kappele
By Francis M. Wright
Attorney No. 730,375. Patented June 9, 1903.

UNITED STATES PATENT OFFICE.

ARTHUR J. KAPPELE, OF VANCOUVER, CANADA.

MECHANICAL MOVEMENT.

SPECIFICATION forming part of Letters Patent No. 730,375, dated June 9, 1903.

Application filed September 4, 1902. Serial No. 122,138. (No model.)

*To all whom it may concern:*

Be it known that I, ARTHUR J. KAPPELE, a subject of the King of Great Britain, residing at Vancouver, British Columbia, Canada, have invented certain new and useful Improvements in Mechanical Movements, of which the following is a specification.

My invention relates to improvements in mechanical movements, the object of my invention being to provide a device of the character which shall be especially useful for increasing leverage for propelling bicycles or automobiles or for similar purposes.

My invention therefore resides in the novel construction, combination, and arrangement of parts for the above ends hereinafter fully specified, and particularly pointed out in the claims.

In the accompanying drawings, Figure 1 is a perspective view of my improved mechanical movement in one position. Fig. 2 is a similar view of the same in another position. Figs. 3, 4, and 5 are transverse sections of Fig. 1 on the lines A A, B B, and C C, respectively.

Referring to the drawings, 1 represents a frame for my improved movement, which frame may be of any suitable construction. I have here shown it as comprising the side tubes 2, connected by the cross-tubes 3, 4, 5, and 6, said tubes serving to securely tie the side tubes together and at the same time to form bearings for the shafts of my improved movement.

Within the bearings 3 and 6 are mounted cross-shafts 7 8, each carrying at its ends the oppositely-directed crank-arms 9 and 10. The crank-arms 9 on one side of the device are connected by a link 11, and the crank-arms 10 on the opposite side are connected by a link 12. Said crank-arms being of equal length and parallel with each other, the links 11 12 are parallel to each other and to the plane through the shafts 7 8. Each of the links 11 12 carries a pin 13, which enters a slot 14 in a crank 15, said cranks 15 being mounted on the ends of short shafts 16, rotating in the bearing 5. The shafts 16 are arranged midway between the shafts 7 8; but each pin 13 is at equal distances from the ends of the links 11 12. Obviously each point in either of the links 11 12 rotates in a circle of the same radius as the length of the cranks 9 10 and about a center which is at the same distance from the shafts 7 8 as the point itself is from the ends of the links. Therefore the pins 13 move in such circles and about such centers. It follows that the pins 13, while imparting a rotary movement to the slotted cranks, will also move longitudinally therein. Each pin will move to the outer end of its slotted crank when said crank is directed toward the shaft 7 to whose crank-arm the pin 13 is the nearer, and the pin 13 will move up to the inner end of the slot when the crank is turned in the opposite direction—that is to say, toward the shaft 8. Thus the leverage exerted upon each shaft 16 will vary from the full length of the crank 15 to a very small fraction thereof.

Each shaft 16 carries a segment-gear 17, which, when the crank is pointing forwardly or toward the shaft 7, and the leverage is therefore increasing, comes into engagement with a gear-wheel 18, mounted upon a shaft 19 in the bearing 4. Said segment-gear 17 engages said gear-wheel 18 while the leverage is at its maximum, and when the leverage diminishes by reason of the slotted crank moving away from the shaft 7 toward the shaft 8 the segment-gear moves out of engagement with the gear-wheel and revolves freely. At this time, however, the segment-gear on the opposite side of the frame comes into engagement with the gear-wheel on the opposite side upon the same shaft 19 and the leverage exerted upon the slotted crank at the opposite side is at its maximum. The two shafts 16 revolve at different speeds, moving slowly when the leverage is great and rapidly when the leverage is small.

Power may be applied in any convenient manner. For instance, treadles 20 may be attached to the sides of the links 11 12.

I claim—

1. In a mechanical movement, the combination of the shaft, the gear-wheels thereon, the segment-gears alternately engaging therewith, the slotted cranks rotating with said segment-gears, the rotating shafts, the crank-arms thereon, the links connecting the end of said crank-arms, and the pins carried by said links and engaging said slotted cranks, substantially as described.

2. In a mechanical movement, the combination of the shaft, the gear-wheels thereon, the segment-gears alternately engaging said gear-wheels, the slotted cranks rotating with said segment-gears, the pins moving in said slotted cranks, and means for imparting a circular movement to said pins eccentric to the center of rotation of the slotted cranks, substantially as described.

In witness whereof I have hereunto set my hand in the presence of two subscribing witnesses.

ARTHUR J. KAPPELE.

Witnesses:
STUART LIVINGSTON,
H. DeW. KELLY.